United States Patent

Norris

[15] 3,661,064
[45] May 9, 1972

[54] STEREO RANGEFINDER
[72] Inventor: Philip R. Norris, North Reading, Mass.
[73] Assignee: Polaroid Corporation, Cambridge, Mass.
[22] Filed: May 15, 1970
[21] Appl. No.: 37,667

[52] U.S. Cl. ..................................95/44 C, 356/8, 356/12
[51] Int. Cl. ..........................................................G03b 3/00
[58] Field of Search .......................95/44 R, 44 C; 356/8, 12

[56] References Cited

UNITED STATES PATENTS 3,200,727  8/1965  Barton...............................356/12 X Primary Examiner—Samuel S. Matthews
Assistant Examiner—Richard A. Wintercorn
Attorney—Brown and Mikulka

[57] ABSTRACT

A photographic camera having a variable focus objective lens incorporates a binocular rangefinder of the "stereo" type including a reticle and lens means for projecting a virtual image of the reticle a predetermined distance into the viewed field. Left and right eye view windows are located to intercept different portions of common imaging wavefronts defining the virtual reticle image. The rangefinder is coupled to a focus adjustment mechanism for the camera such that the image distance of the projected reticle image and the focused distance of the camera objective lens are caused to vary in correspondence. A novel rangefinding method is also disclosed.

22 Claims, 7 Drawing Figures

PATENTED MAY 9 1972

INVENTOR
PHILIP R. NORRIS
BY, Brown and Mikulka
and
John H. Coult
ATTORNEYS

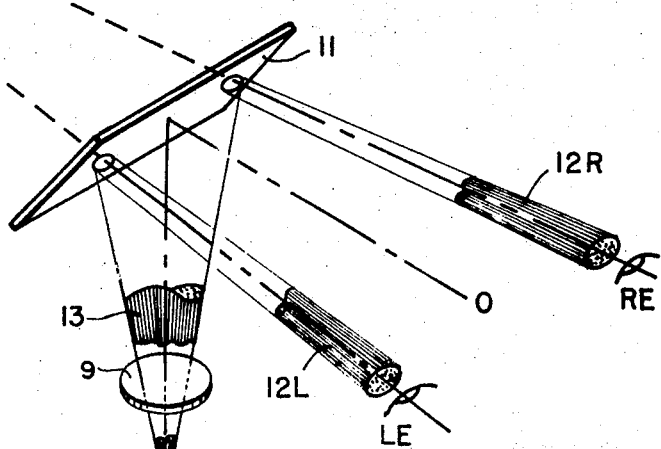
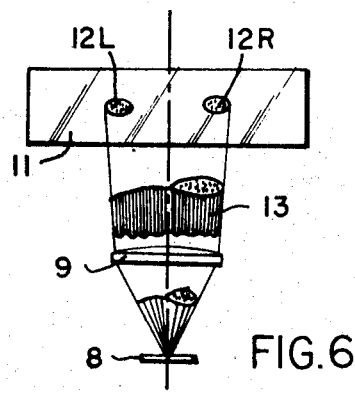
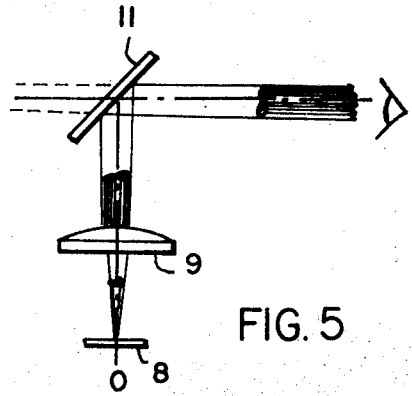
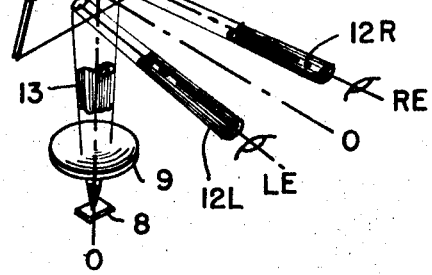

STEREO RANGEFINDER

BACKGROUND OF THE INVENTION

This application concerns a photographic camera having a binocular rangefinder of the type commonly termed "stereo rangefinder" wherein a virtual image of a reticle is projected a variable distance into the field.

Stereo rangefinders of the described type have traditionally employed a pair of like left and right eye telescopes. For example, see U.S. Pat. Nos. 1,514,948 — Baer et al.; 2,144,257 — Eppenstein; and 2,425,713 — Applegate. Each telescope includes a reticle (or erects a reticle image) at or within the focal plane of the telescope objective; virtual images of the reticles are projected into the field by the objectives. As evidenced by the noted patents, these telescopes usually have substantial optical complexity.

Various mechanisms, many of them quite intricate, have been employed for adjusting the depth-wise position of the respective reticle images in the field and for simultaneously varying the angle of convergence of the left and right projection axes in order to cause the convergence point of the axes and the reticle images to coincide and to move in correspondence.

The attendant alignment, calibration, and correlation problems encountered in attempting to achieve the above are substantial. Various attempts to overcome certain of these problems are illustrated in U.S. Pat. Nos. 2,166,046 — French; 2,350,210 — Aulin; and 2,991,683 — Gunther, inter alia. Compensation for inter-ocular variations among users is also difficult in such dual systems, as recognized in Pat. No. 2,932,234 — Gunther.

OBJECTS OF THE INVENTION

It is a primary object of this invention to provide an improved rangefinding method and to provide a stereo rangefinder in which exact registration of the virtual left and right eye reticle images perceived by an observer is inherent for any and all positions of the reticle image in the field. It is thus an object to provide a stereo rangefinder in which problems associated with structural alignment and calibration, registration of images, correlation of image movements, and sensitivity to inter-ocular variations are substantially non-existent.

It is yet another object of this invention to provide a stereo rangefinder which is characterized by extreme simplicity in structure and operation.

It is a further object to provide a photographic camera having a coupled rangefinder in which a projected reticle image is caused to advance or recede in the field in response to adjustments of a focus control mechanism for the camera objective.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 4 is an extremely schematic perspective view of a second embodiment of the invention which is particularly useful in illustrating the principles of this invention;

FIGS. 5 and 6 are side and front elevational views of the FIG. 4 embodiment; and FIG. 7 is a view of the FIGS. 4–6 rangefinder adjusted such that the projected reticle image has been advanced toward the observer.

DESCRIPTION OF THE PREFERRED EMBODIMENTS

Figure 1:
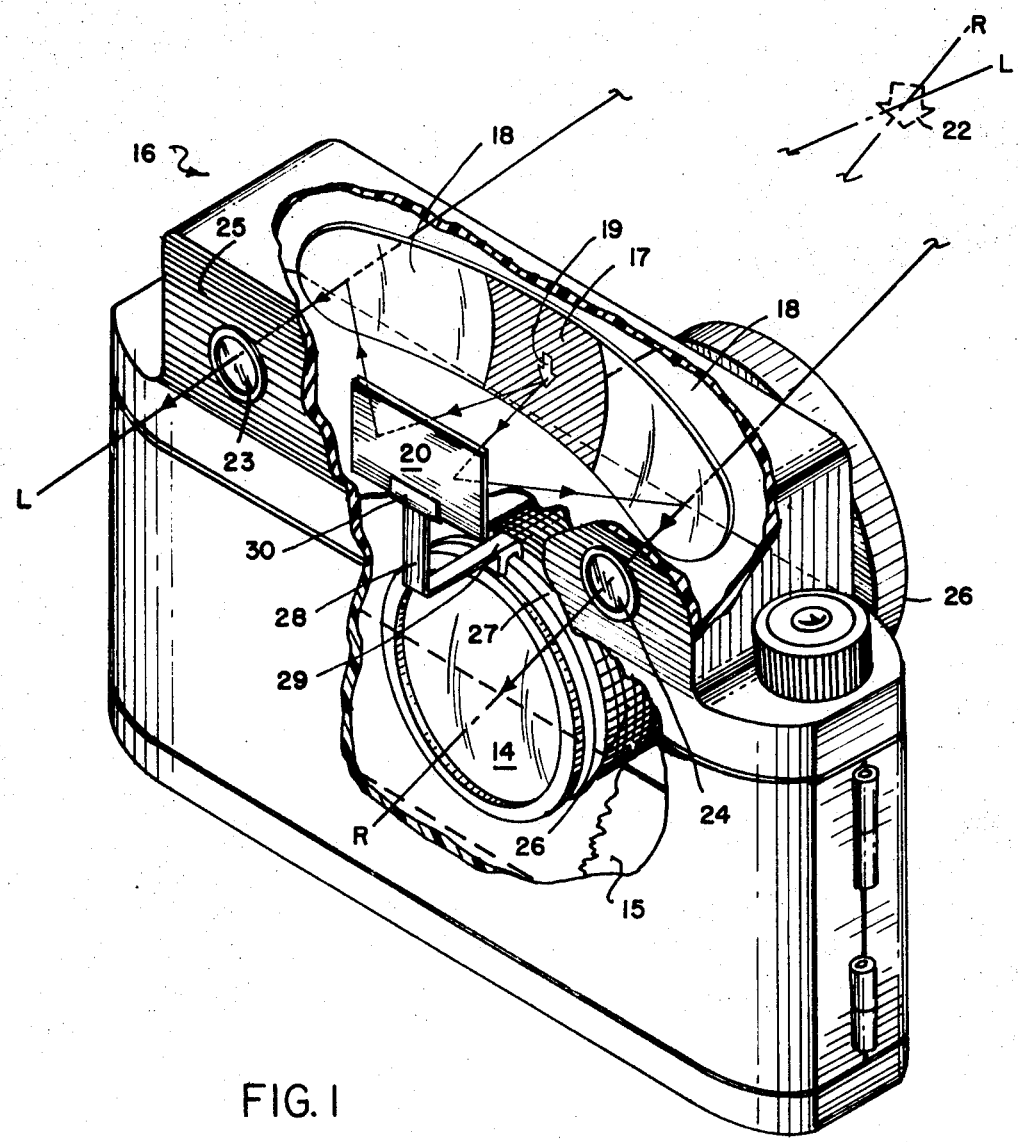
FIG. 1 is a schematic perspective view of a photographic camera having a coupled rangefinder constructed in accordance with the teachings of this invention.
Figure 2:
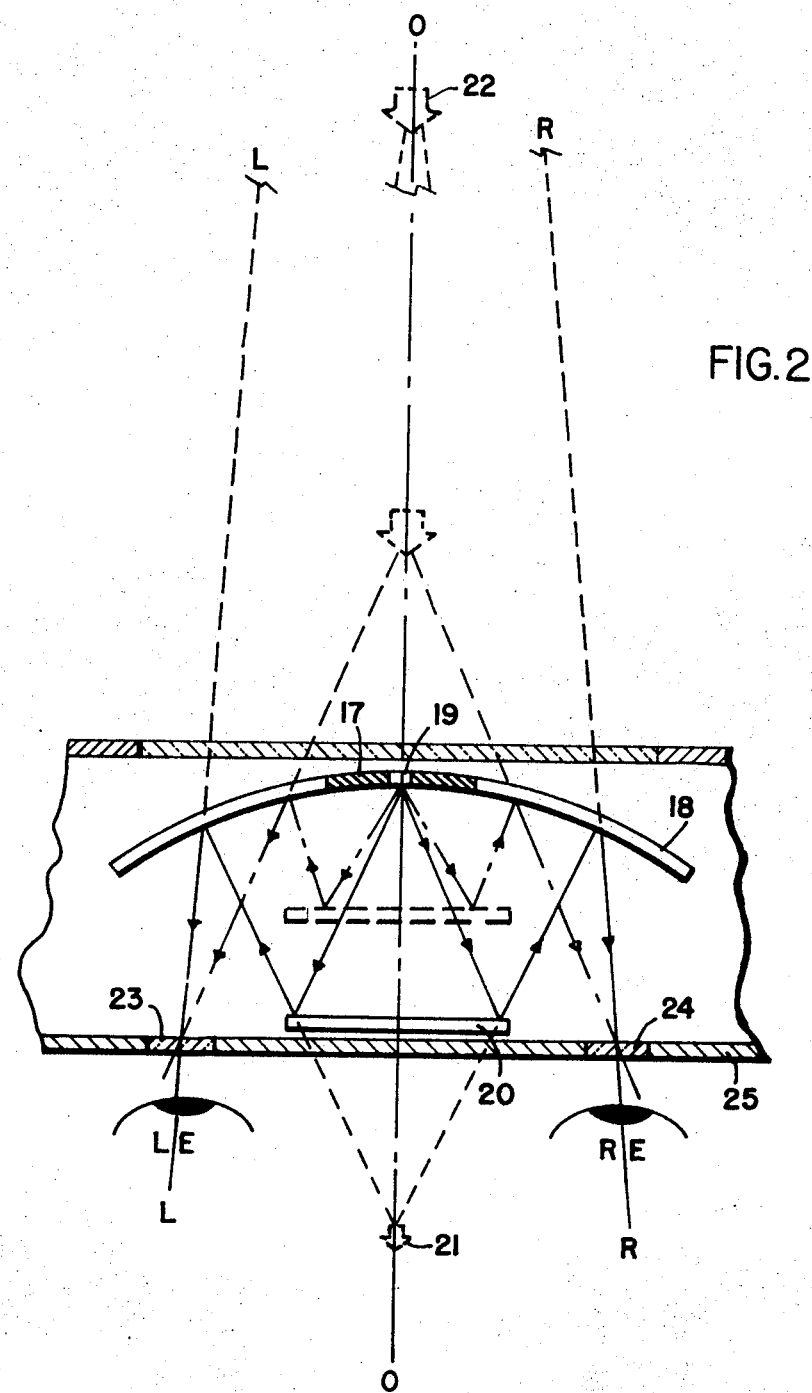
FIG. 2 is a top (plan) view of a portion of the rangefinder shown in FIG. 1.

FIGS. 1 and 2 illustrate a photographic camera incorporating a stereo rangefinder representing a preferred implementation of the principles of this invention. FIGS. 4–7 show a second embodiment of the invention which is perhaps more useful than the FIGS. 1–2 embodiment in clarifying the underlying principles of this invention. In order that the invention may be clearly understood before a discussion of FIGS. 1–2 is engaged, the FIGS. 4–7 embodiment will be discussed first.

As noted above, all known prior art stereo rangefinders employ a pair of substantially optically independent reticle projection systems. Because of the independence of the left and right projection systems, there exists serious problems in attempting to register the left and right reticle images in the field, and of maintaining close registration of these images as the effective projected distance of the composite stereo reticle image is caused to recede or advance in the field.

At the heart of this invention lies the fact that a single reticle and a single imaging means are employed to project a single virtual image of the reticle into the field. The image is viewed by the left and right eyes of an observer which intercept different portions of common imaging wavefronts constituting the reticle image. In other words, both eyes view a single reticle image by intercepting different portions of a single bundle of imaging rays which define the projected virtual reticle image. Thus, this invention provides for the first time a true stereoscopic rangefinder in which the left and right eyes of the observer receive a true stereo pair of images of a single unitary reticle image, rather than receiving a simulated stereo pair of images which, when properly viewed, appear to represent a single unitary reticle image.

By the fact that a single reticle image is erected, rather than a pair of images as in prior art approaches, the problems of misregistration, correlation of changing left and right image distances, and tracking of the convergence point of a pair of stereo axes by the left and right reticle images are all obviated.

FIGS. 4–7 show a reticle 8 and a dioptric lens 9, located at most a focal length away from the reticle 8, for forming a virtual image 10 of the reticle 8. A partially reflective planar mirror 11 is angled with respect to the optical axis 0—0 of the lens 9 to reflect the virtual reticle image 10 into the field of view of an observer. The observer is represented in FIGS. 4 and 7 by a left eye LE and a right eye RE. As can be seen quite clearly in FIGS. 4–6, the left and right eyes of the observer intercept left and right portions 12L, 12R of a single bundle 13 of imaging rays which define the reticle image 10. Stated in terms of waves rather than rays, the observer's left and right eyes intercept different portions of common imaging wavefronts defining the virtual reticle image.

FIG. 7 is a view very similar to FIG. 4 but having the object distance from the reticle 8 to the lens 9 reduced so as to effect a corresponding decrease in the image distance of the reticle image 10. It is evident from FIGS. 4–7 that as the virtual reticle image 10 is caused to advance or recede in the field, the observer is able to follow the image 10 in the manner in which he would follow any object moving toward or away from him in the field.

FIGS. 1 and 2 represent a structurally more preferred embodiment of the principles of this invention. A camera is shown very schematically as including a variable focus lens 14 for forming images on an element of photosensitive material 15. Means for controlling the exposure interval and effective aperture are not shown, but may be of any suitable commercially available type. A novel rangefinder 16 according to this invention is shown as including a reticle 17 and a partially reflective catoptric lens 18. The catoptric lens 18 comprises a section of a partially mirrorized transparent spherical shell. In the FIGS. 1–2 embodiment the reticle 17 comprises a mask defining a transparent window 19 in the configuration of an arrow. A fully silvered planar mirror 20 is employed to form a first image 21 of the reticle 18 at most a focal length away from the lens 20.

In the same manner that dioptric lens 9 in the FIGS. 4–7 embodiment projects a virtual image of reticle 8, the catoptric lens 18 projects into the field a virtual image 22 of the first reticle image 21 formed by mirror 20. The projected reticle image 22 may be seen by the left and right eyes of an observer located at left and right eye view windows 23, 24 in the rangefinder housing 25 and looking along left and right ocular axes L—L and R—R, respectively.

As explained with reference to the FIGS. 4–7 embodiment, the left and right eyes of an observer located at the left and right eye windows 23, 24 intercept different portions of common imaging wavefronts (formed by the catoptric lens 20) which define the projected reticle image 22. The image distance of the projected reticle image 22 is identifiable with the range of objects in the field which appear, to an observer looking into the field through the windows 23, 24, to be situated in the vicinity of the reticle image 22.

In order that the position of the projected reticle image 22 may be varied along the axis 0—0, i.e., in a depth-wise sense, means are provided for adjusting the axial position of the mirror 20 relative to lens 18 and thus the object distance of the first reticle image 21 formed by the mirror 20. It is an object of this invention to provide a camera having a coupled stereo rangefinder in which movement of the projected reticle image is correlated with adjustments in the focused distance of the camera objective.

To these ends, in order to couple movement of the mirror 20 to adjustments of the focus of objective lens 14, coupling means are provided. In the illustrated embodiment, the lens assembly containing the lens 14 is of the type wherein rotation of a lens barrel 26 causes the barrel 26 and the lens 14 contained therein to move along the axis thereof. The lens barrel 26 is shown as including a cam ring 27. A coupling member 28 has a cam follower 29 which engages the cam ring 27 at one end and at the other end is connected directly to support means 30 holding the mirror 20. Rotation of the lens barrel 26 to adjust the focus of the lens 14 causes the mirror 20 to move in a corresponding direction. It is manifest from an inspection of FIGS. 1 and 2 that a forward movement of the lens 14 so as to focus on nearer objects results in a forward movement of the mirror 20 and a resultant advancement of the projected reticle image 22 toward the observer. The profile of the cam ring 27 is selected such as to cause the projected reticle image 22 to track (follow) the focused distance of the lens 13.

An important aspect of this invention is the extreme simplicity of the rangefinders disclosed. By the use of a single reticle which is first imaged virtually by a position-adjustable mirror and then reimaged into the field by imaging means (such as the described catoptric lens), the optical apparatus necessary to erect a stereoscopically observable reticle image is very greatly simplified. Further, the capability of moving the projected image while maintaining inherent registration of left and right eye images by merely adjusting the position of a single element, the adjustable mirror, is a vast and significant advancement over prior art structures. Thus, this invention teaches rangefinding methods and apparatus of extreme simplicity in which left and right eye images are inherently registered and in which depth-wise movement of the projected image is accomplished by adjustment of a single optical element and during which movement image registration is inherently maintained. This invention makes possible for the first time a low cost stereo rangefinder of uncompromising accuracy and ease of use.

Figure 3:
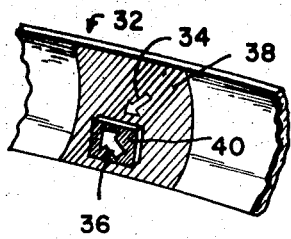
FIG. 3 is an alternative embodiment of reticle means shown in FIG. 1.

FIG. 3 illustrates a three-dimensional reticle 32 which may be substituted for the reticle 17 in the FIGS. 1–2 embodiment, or may be adapted to be substituted for the reticle 8 in the FIGS. 4–7 embodiment. A virtual image of the reticle 32 will have an illusion of depth due to the depth-wise extension of the reticle 32, the smaller arrow 34 appearing more distant from the observer than the larger arrow 36.

The reticle 32 may be constructed by forming the smaller arrow 34 as a frosted light-transmitting window in a mask 38. The arrow 36 may comprise a frosted light-transmitting window defined by mask 38 and a masked rear surface on a spacer plate 40. The arrows 34, 36 will thus be axially separated in space to cause the images of the arrows formed in the field to also be spaced in a depth-wise sense.

The invention is not limited to the particular details of construction of the embodiments depicted, and it is contemplated that various and other modifications and applications will occur to those skilled in the art.

For example, rather than using a reticle imaging lens which occupies a full field of view of the rangefinder, a narrow horizontal section of the lens may be employed which occupies but a fraction of the rangefinder field angle in the vertical dimension. The reticle itself may be of any desired configuration — e.g., in photographic camera embodiments the reticle might define a frame for delimiting the portion of the field recordable by the camera.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A binocular rangefinder, comprising:
   reticle means;
   optical means, including imaging means, for projecting a virtual image of said reticle means a predetermined image distance into a field; and
   means for defining spaced left and right eye view locations and for intercepting different portions of common imaging wavefronts defining said virtual reticle image, the said image distance of the reticle image being identifiable with the range of objects in the field which appear, to an observer looking into the field through said eye view locations, to be situated in the vicinity of the reticle image.

2. A binocular rangefinder, comprising:
   reticle means;
   optical means, including imaging means, for projecting a virtual image of said reticle means a predetermined image distance into a field, said imaging means includes a partially reflective positive power catoptric lens; and
   means defining spaced left and right eye view locations intercepting different portions of common imaging wavefronts defining said virtual reticle image, said partially reflective positive catoptric lens being disposed across at least a portion of the field viewable from said left and right eye view locations, the said image distance of the reticle image being identifiable with the range of objects in the field which appear, to an observer looking into the field through said eye view locations, to be situated in the vicinity of the reticle image.

3. The apparatus defined by claim 2 wherein said optical means includes relay means for forming a first image of said reticle means behind and at most a focal length away from said lens for projection by said lens into the field.

4. The apparatus defined by claim 3 wherein said reticle means is disposed substantially at said lens and on the optical axis thereof, and wherein said relay means includes a mirror disposed behind said catoptric lens for forming said first reticle image.

5. The apparatus defined by claim 4 wherein said reticle means comprises a mask on a central portion of said catoptric lens, said mask defining window means the boundaries of which determine the configuration of said reticle image.

6. The apparatus defined by claim 5 including adjustable control means for varying the depthwise position of said projected reticle image, said control means including means coupled to said mirror for adjusting the axial position of said mirror and thereby the spacing of said first reticle image from said lens.

7. The apparatus defined by claim 1 wherein said reticle means has a significant dimension in a direction parallel to the principle axis of said imaging means such that said projected virtual image of said reticle has a visually perceptible depthwise extension.

8. In a photographic camera the combination comprising:
a variable focus objective lens and focus control means operable to change the focus of said lens;
a binocular rangefinder comprising:
reticle means,
optical means including imaging means for projecting a virtual image of said reticle means a predetermined image distance into a field, and
means defining spaced left and right eye view locations intercepting different portions of common imaging wavefronts defining said virtual reticle image;
adjustable means for varying the distance said reticle image is projected; and
coupling means coupling said focus control means and said adjustable means such that adjustment of said focus control means until said reticle image appears to lie in the vicinity of an object to be photographed causes said objective lens to be focused on said object.

9. The apparatus defined by claim 8 wherein said imaging means includes a partially reflective positive power catoptric lens disposed across at least a portion of the field viewable from said left and right eye view locations.

10. The apparatus defined by claim 9 wherein said optical means includes relay means for forming a first image of said reticle means behind and at most a focal length away from said lens for projection by said lens into the field.

11. The apparatus defined by claim 10 wherein said reticle means is disposed substantially at said lens and on the optical axis thereof, and wherein said relay means includes a mirror disposed behind said catoptric lens for forming said first reticle image.

12. The apparatus defined by claim 11 wherein said reticle means comprises a mask on a central portion of said catoptric lens, said mask defining window means the boundaries of which determine the configuration of said reticle image.

13. The apparatus defined by claim 11 wherein said coupling means is connected to said mirror to effect axial movement thereof in response to adjustments of said focus control means, movement of said mirror effecting an axial movement of said first reticle to said lens and thus a depthwise movement of said projected image.

14. The apparatus defined by claim 1 wherein said imaging means includes a positive power dioptric lens, and wherein said optical means includes a partially reflective mirror disposed across at least a portion of the field viewable from said left and right eye view locations for reflecting said imaging wavefronts defining said virtual reticle image to said eye view locations.

15. The apparatus defined by claim 14 wherein said reticle means has a significant dimension in a direction parallel to the principle axis of said imaging means such that said projected virtual image of said reticle has a visually perceptible depthwise extension.

16. A stereo rangefinder, comprising:
means defining left and right eye view locations;
reticle means positioned on an axis extending into the rangefinder field along a locus passing equidistant from said left and right eye view locations;
a mirror disposed behind said reticle means on said axis for forming a first virtual image of said reticle means;
positive power partially reflective catoptric lens means positioned forwardly of said mirror and at most a focal length away from said first image of said reticle means forming in the field of the rangefinder a second virtual image of said reticle means; and
means for varying the depthwise position of said second image in the field, said means including means coupled to said mirror for moving said first mirror so as to vary the spacing of said first image from said catoptric lens means and thus the depthwise position in the field of said second image of said reticle means.

17. A stereo rangefinder, comprising:
means defining left and right eye view locations;
reticle means positioned on an axis extending into the rangefinder field along a locus passing equidistant from said left and right eye view locations;
a mirror disposed behind said reticle means on said axis for forming a first virtual image of said reticle means;
first and second positive power catoptric lens elements respectively aligned with said first and second eye view locations and each receiving object rays from said first image for conjointly forming in the field of the rangefinder a virtual image of said first image;
means for varying the depth-wise position of said second image in the field, said means including means coupled to said mirror for moving said first mirror so as to vary the spacing of said first image from said catoptric lens elements and thus the depth-wise position in the field of said second image of said reticle means.

18. A rangefinding method, comprising:
projecting into a field a visible virtual image of a reticle;
binocularly observing the image from spaced left and right eye view locations intercepting different portions of common imaging wavefronts defining the said virtual reticle image;
adjusting the image distance of the reticle image until the image appears to generally correspond in spatial position with an object in the field whose range is sought; and
utilizing the image distance when said correspondence is established as an indication of the range of the object.

19. A binocular rangefinder functioning on the principle of correspondence between two visual convergence angles to determine the distance to a subject, a first of said convergence angles fusing a right eye image and left eye image of said subject, and a second of said convergence angles fusing a right eye image and left eye image of a reticle, said binocular rangefinder comprising:
concave mirror means with at least one partially transparent reflecting surface with a predetermined focal length, said concave mirror means having a right viewing portion to provide said right eye images and a left viewing portion to provide said left eye images, said portions having a generatrix common to both and a fixed orientation with respect to each other; and
reticle means equally spaced from said right viewing portion and from said left viewing portion by optical paths of equal length and viewable by reflection from the concave surface of said concave mirror means.

20. The binocular rangefinder described in claim 19, further comprising means for varying the length of said optical paths 21. The binocular rangefinder described in claim 19, further comprising:
planar mirror means, opposite said concave mirror means, for reflecting at least one image of said reticle to said concave surface.

22. The binocular rangefinder described in claim 19, wherein said optical paths have lengths not exceeding said predetermined focal length.

* * * * *